United States Patent
Dasgupta et al.

(10) Patent No.: US 7,652,489 B2
(45) Date of Patent: *Jan. 26, 2010

(54) MULTI-RANGE CLEARANCE MEASUREMENT SYSTEM AND METHOD OF OPERATION

(75) Inventors: Samhita Dasgupta, Niskayuna, NY (US); Minesh Ashok Shah, Clifton Park, NY (US); Kiyoung Chung, West Chester, OH (US); Emad Andarawis Andarawis, Ballston Lake, NY (US); William Lee Herron, Cincinnati, OH (US); Hans Max Ortlepp, Milford, OH (US)

(73) Assignee: General Electric Company, Niskayuna, NY (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/295,362

(22) Filed: Dec. 6, 2005

(65) Prior Publication Data

US 2007/0128016 A1 Jun. 7, 2007

(51) Int. Cl.
*G01R 27/26* (2006.01)
(52) U.S. Cl. .................................... 324/690; 324/662
(58) Field of Classification Search ................ 324/660, 324/690, 644, 671, 662, 694
See application file for complete search history.

(56) References Cited

U.S. PATENT DOCUMENTS

| 3,074,351 | A | | 1/1963 | Foster | |
|---|---|---|---|---|---|
| 4,806,848 | A | * | 2/1989 | Demers | 324/662 |
| 4,971,517 | A | * | 11/1990 | Perkey et al. | 415/14 |
| 5,070,302 | A | | 12/1991 | Marcus et al. | 324/662 |
| 5,166,626 | A | | 11/1992 | Hester et al. | 324/690 |
| 5,616,009 | A | | 4/1997 | Birdwell et al. | |
| 7,332,915 | B2 | * | 2/2008 | Andarawis et al. | 324/662 |
| 2003/0094956 | A1 | * | 5/2003 | Orenstein | 324/644 |
| 2004/0251916 | A1 | * | 12/2004 | Kirzhner | 324/635 |
| 2006/0125492 | A1 | * | 6/2006 | Andarawis et al. | 324/667 |

* cited by examiner

*Primary Examiner*—Vincent Q Nguyen
(74) *Attorney, Agent, or Firm*—Patrick K. Patnode

(57) ABSTRACT

A system for measuring clearance between a stationary object and a movable object is provided. The system includes at least one sensor configured to be disposed on the stationary object and configured to measure an operating parameter corresponding to the movable object and a controller coupled to the at least one sensor, wherein the controller is configured to control an operating mode of the sensor based upon the measured operating parameter.

20 Claims, 7 Drawing Sheets

MULTI-RANGE CLEARANCE MEASUREMENT SYSTEM AND METHOD OF OPERATION

BACKGROUND

The invention relates generally to clearance measurement systems, and more particularly to, a multi-range clearance measurement system for measuring a clearance between a stationary component and a movable component of a rotating machine.

Various types of sensors are known and are in use in different applications. For example, in an aircraft engine, a turbine has a turbine blade that is disposed adjacent to a shroud. The clearance between the turbine blade and the shroud varies depending on the temperature of the turbine components. For example, the clearance between the shroud and the turbine blade is greatest when the turbine rotor is cold and gradually decreases as the turbine rotor heats up. It is desirable that a minimum gap or clearance between the turbine blade and the shroud be maintained for operating efficiency and for safe and effective operation of the turbine.

Unfortunately, existing control systems do not accurately respond to varying clearances during different stages of operation. Thus, the existing control systems typically result in reduced performance, inefficiencies, or undesirable wear. In particular, existing clearance measurement systems have a marked tradeoff between accuracy and operating range thus resulting in reduced performance during different stages of operation.

Accordingly, a need exists for providing a clearance measurement system that provides an accurate measurement of clearance between two components over an entire range of operation of an engine. It would also be advantageous to provide a self-calibrating clearance measurement system that could be employed for accurate clearance measurement for parts in operation.

BRIEF DESCRIPTION

In accordance with certain embodiments, the present technique has a system for measuring clearance between a stationary object and a movable object. The system includes at least one sensor configured to be disposed on the stationary object and configured to measure an operating parameter corresponding to the movable object and a controller coupled to the at least one sensor, wherein the controller is configured to control an operating mode of the sensor based upon the measured operating parameter.

In accordance with certain embodiments, the present technique has a system. The system includes a rotating component spaced apart from a stationary component and a sensor disposed on the stationary component, wherein the sensor is configured to measure a speed of rotation of the rotating component and wherein an operating range of measurement of the sensor is controlled in response to the measured speed of rotation.

In accordance with certain embodiments, the present technique has a method of measuring clearance between a stationary part and a rotating part. The method includes measuring a speed of rotation of the rotating part via a sensor disposed on the stationary part and switching between a plurality of modes of operation of the sensor based upon the measured speed of rotation.

In accordance with certain embodiments, the present technique has a multi-range sensor. The multi-range sensor includes a plurality of conductive elements configured to measure an operating parameter corresponding to an object and a plurality of switches configured to selectively couple the plurality of conductive elements based upon the measured operating parameter to control a measurement range of the sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
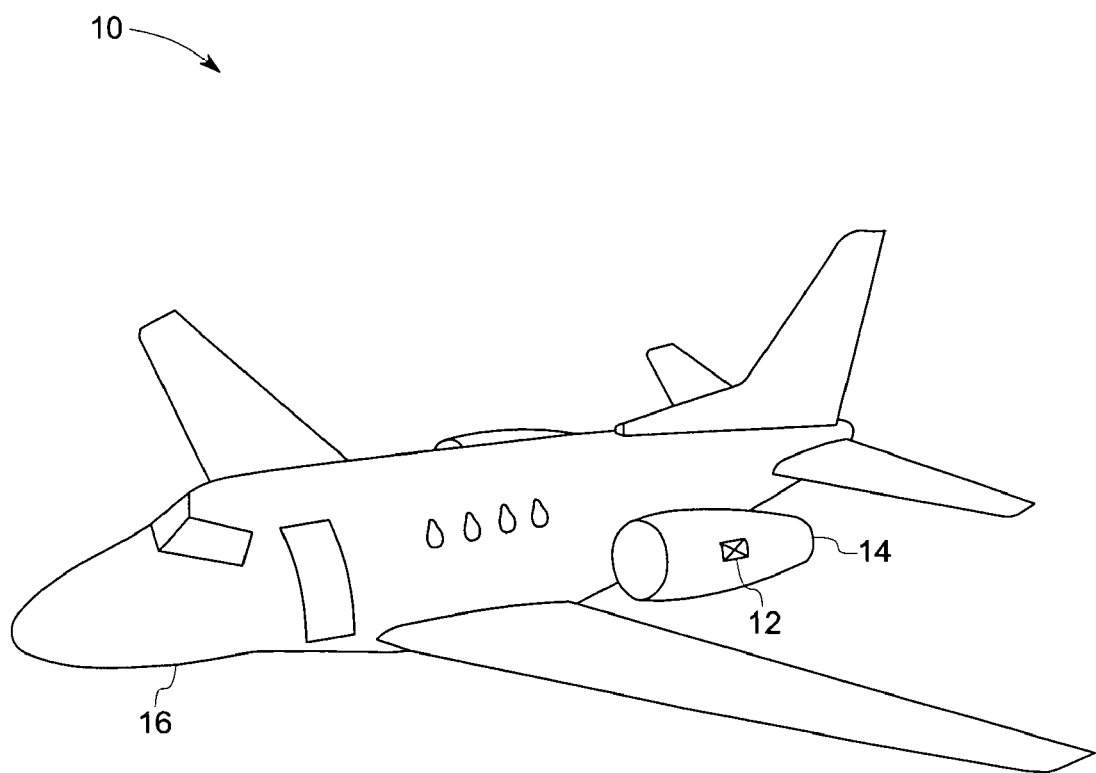
FIG. 1 is a diagrammatical perspective illustration of an aircraft having an engine with sensor system in accordance with embodiments of the present technique.

As discussed in detail below, embodiments of the present technique function to provide an accurate measurement of clearance between two objects in various systems such as a steam turbine, a generator, a turbine engine (e.g., airplane turbine engine), a machine having rotating components, and so forth. Referring now to the drawings, FIG. 1 illustrates an aircraft 10 having a sensor system 12 disposed in an aircraft engine 14 coupled to a body or frame 16 of the aircraft 10. In the illustrated embodiment, the sensor system 12 is configured for measuring a clearance between two objects, such as the clearance between a turbine blade and a shroud in the aircraft engine 14 as will be described in detail below with reference to FIGS. 2-8.

Figure 2:
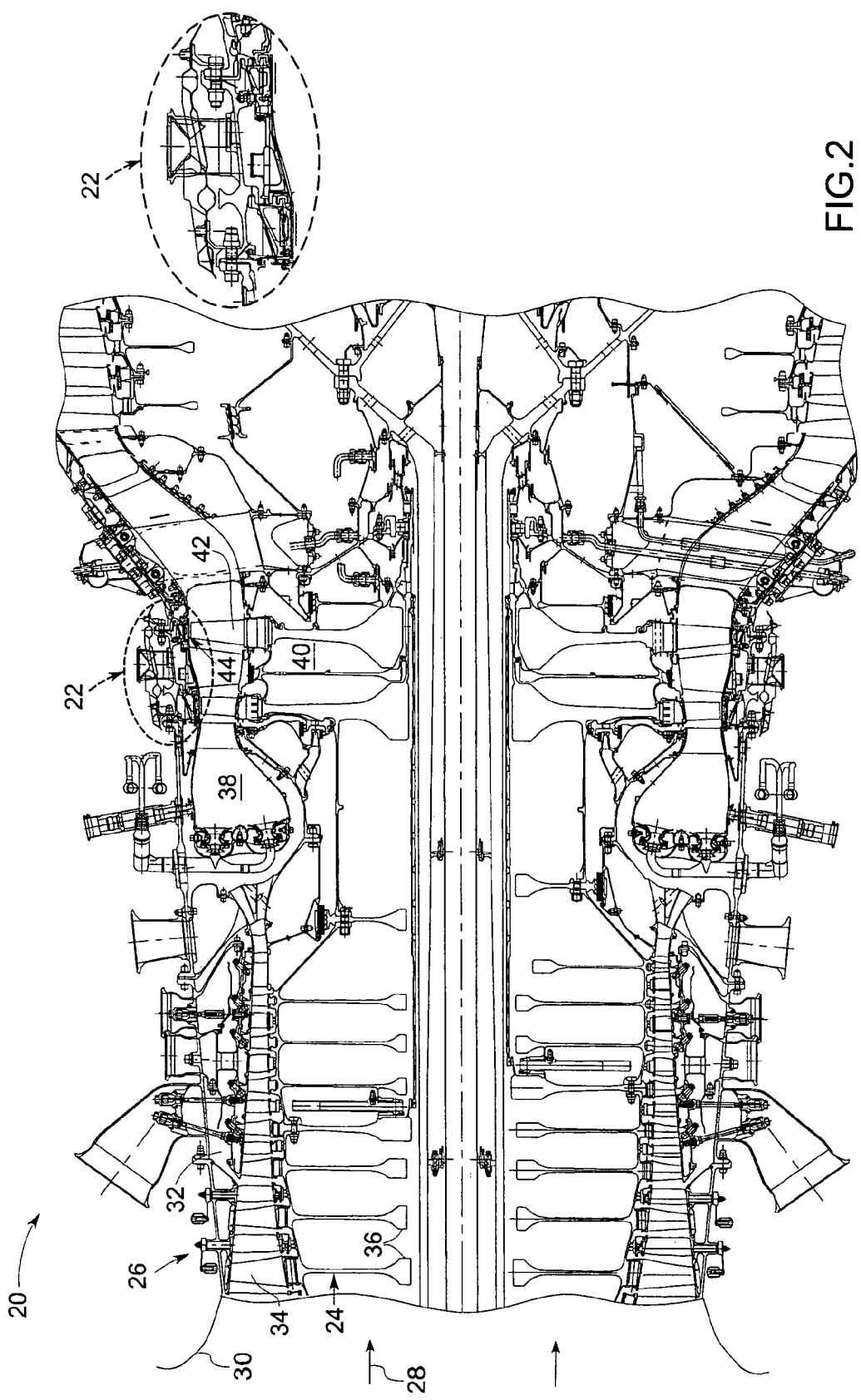
FIG. 2 is a cross-sectional view of the engine of FIG. 1 with an active clearance control system in accordance with embodiments of the present technique.

FIG. 2 is a cross-sectional view of an engine 20, which may be used as the aircraft engine 14 of FIG. 1, with an active clearance control system 22 for controlling the clearance between stationary and rotating parts of the engine 12. The engine 20 includes a compressor section 24 for compressing an ambient flow of air. In the illustrated embodiment, a compressor front frame 26 directs an air flow 28 into the compressor section 24 via a bell mouth entrance 30. In certain embodiments, the compressor section 24 may be divided into low-pressure and high-pressure compressor regions. The compressor section 24 includes a stator casing 32 that includes a plurality of stator vanes that direct air flow within a plurality of stages within the compressor section 24. Further, the compressor section 24 includes a plurality of rotating blades 34 and includes spools 36 and discs supporting the blades 34.

In operation, compressed air from the compressor section 24 is directed to a combustor 38 to combust a fuel stream. The combustor exit gas stream is then directed to a turbine section 40 where it is expanded. As will be appreciated by one skilled in the art, depending on the operational layout, the turbine section 40 may include a plurality of turbines. For example, the turbine section 40 may include a low pressure turbine and a high pressure turbine. In the illustrated embodiment, each turbine 40 includes turbine blades 42 disposed adjacent a shroud 44.

Typically, depending on the operating conditions of the engine 20, the clearance between any turbine blade 42 and the shroud 44 varies depending on the temperature of the turbine blade 42 and the core speed of the engine 20. For example, the clearance between the shroud 44 and the turbine blade 42 is greatest when the turbine 40 is cold and gradually decreases as the turbine 40 speeds and heats up. In the illustrated embodiment, the clearance between the shroud 44 and the turbine blade 42 for different engine operating conditions is controlled via the active clearance control system 22.

In particular, the active clearance control system 22 provides an on-line measurement (i.e., monitoring and measuring during operation) of clearance between the turbine blade 42 and the shroud 44, which may be incorporated into a closed-loop control strategy to maintain these clearances at values within acceptable limits. In this embodiment, the active clearance control system 22 estimates a current clearance based on factors such as measured core speed, airflows, temperature, pressure, altitude, or combinations thereof. Further, a desired or demand clearance is estimated as the function of rotor speed and an altitude. The clearance control system 22 compares the current clearance with the demand clearance and adjusts the position of a turbine valve to reduce the clearance difference between the current and demand clearances toward zero. In a presently contemplated configuration, the clearance control system 22 includes a multi-range clearance measurement system that will be described in a greater detail below.

Figure 3:
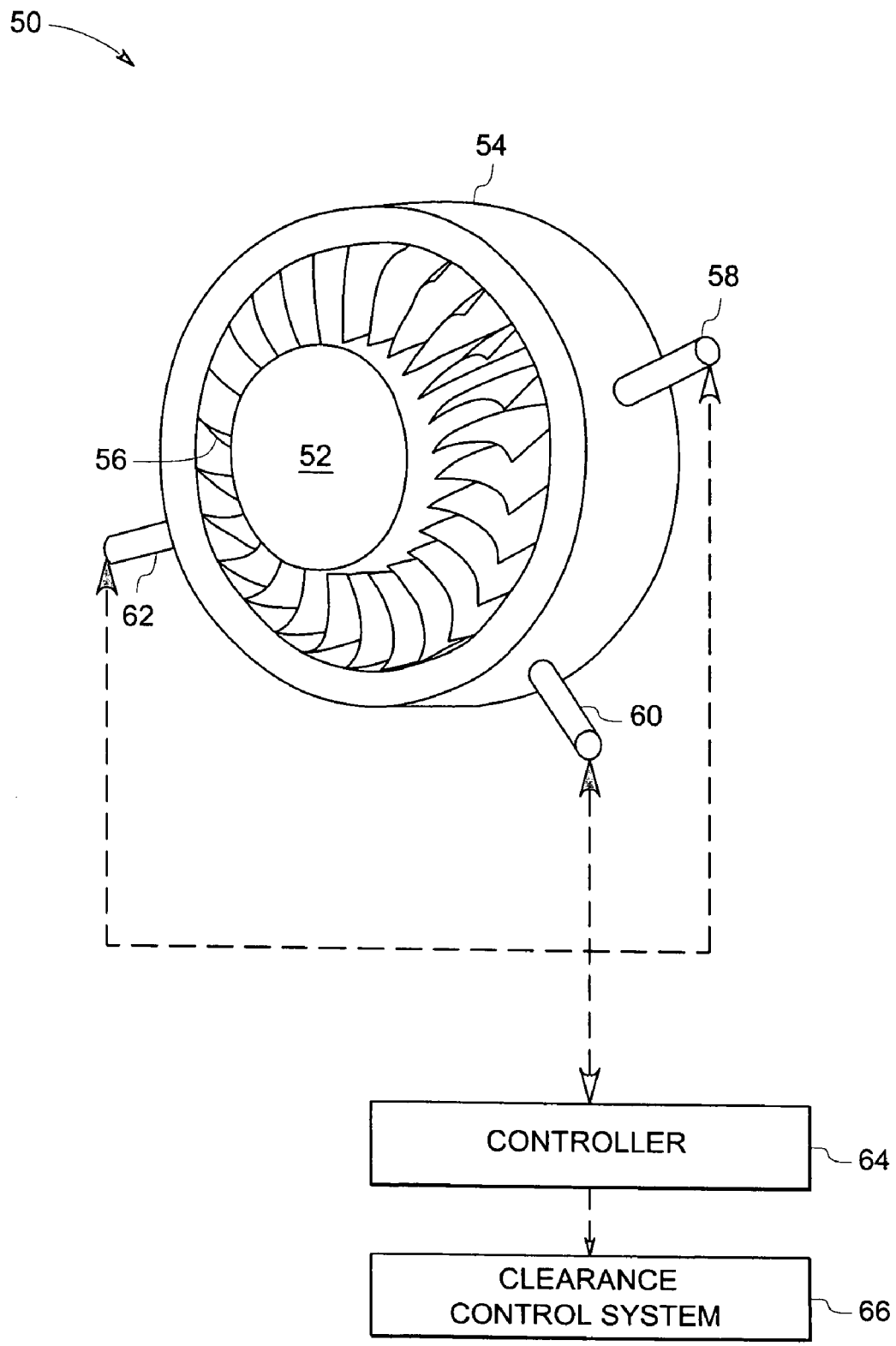
FIG. 3 is a diagrammatical illustration of a turbine of the engine of FIG. 2 having a clearance measurement system in accordance with embodiments of the present technique.

FIG. 3 is a diagrammatical illustration of a turbine 50 of the engine of FIG. 2 having a clearance measurement system in accordance with embodiments of the present technique. The turbine 50 includes a rotor 52 disposed within a casing 54. Further, the rotor 52 includes a number of turbine blades 56 disposed within the casing 54. A number of sensors 58, 60, and 62 are disposed within the casing 54 for measuring the clearance between the casing 54 and the turbine blades 56. In this illustrated embodiment, the three sensors 58, 60, and 62 are employed at three different locations for clearance measurement between the casing 54 and the blades 56. However, a greater or lesser number of sensors may be used in other embodiments.

In the embodiment illustrated in FIG. 3, signals representative of the clearance are detected by the sensors 58, 60 and 62, and the signals are then transmitted to a controller 64 for selecting a sensor configuration for the sensors 58, 60 and 62 based upon an operating parameter. In particular, an operational range of the sensors 58, 60 and 62 is controlled based upon the measured operating parameter. In this embodiment, the sensors 58, 60 and 62 comprise capacitive probes and the measured operating parameter comprises a rotational speed of the rotor 52. Further, the clearance measurement through the sensors 58, 60 and 62 is used for controlling the clearance between the casing 54 and the turbine blades 56 via a clearance control system 66. The technique for selection of the sensor configuration for the sensors 58, 60 and 62 based upon the measured operating parameter will be described in a greater detail below with reference to FIGS. 4-8.

Figure 4:
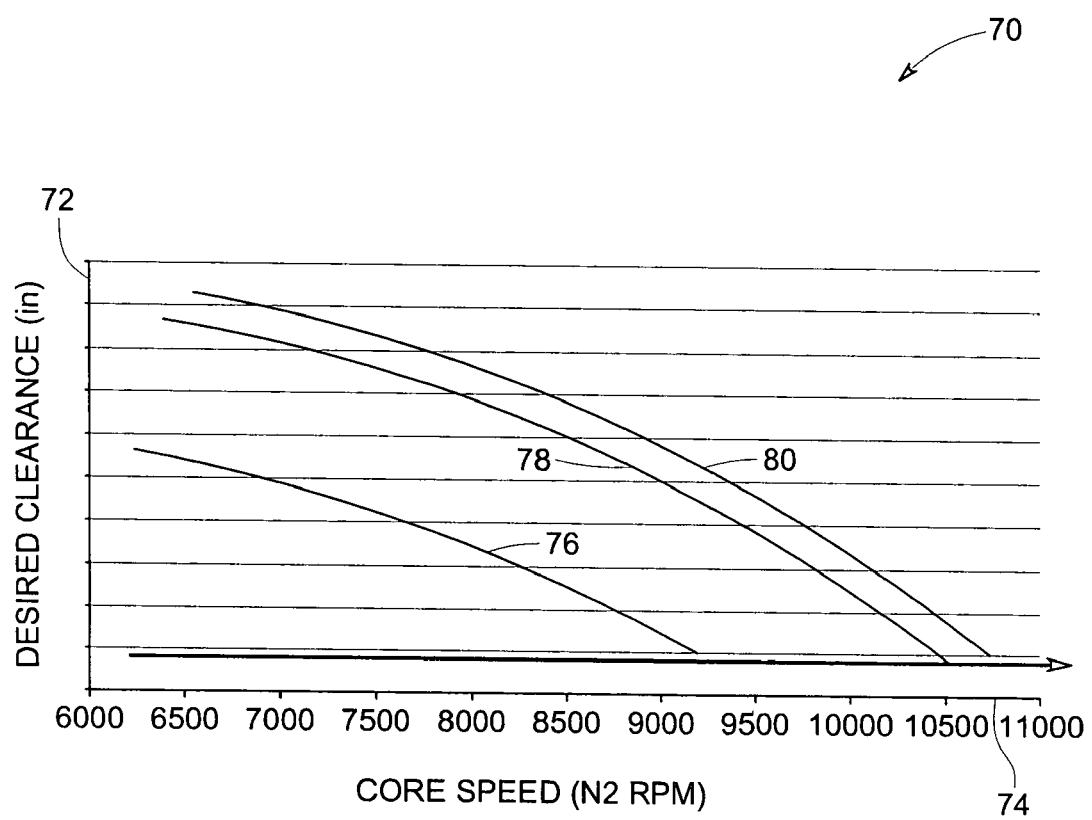
FIG. 4 is a graphical representation of clearance between stationary and rotating components of the turbine of FIG. 3 in response to a speed of rotation of the rotating component in accordance with embodiments of the present technique.

FIG. 4 is a graphical representation 70 of a desired clearance 72 between stationary and rotating components 54 and 52 of the turbine 50 of FIG. 3 in response to a speed of rotation 74 of the rotating component 52. In the illustrated embodiment, the ordinate axis represents the clearance between the rotor 52 and the stator 54 and the abscissa axis represents core speed of rotation of the rotor 52. Further, profiles for the clearance 72 between the stationary and rotating components 54 and 52 on a cold day, a standard day and a hot day are represented by reference numerals 76, 78 and 80, respectively. In this embodiment, the ambient temperature on a cold day is about 30° F., on a standard day is about 59° F. and on a hot day is about 125° F. As illustrated, the clearance between the stationary and rotating components 54 and 52 decreases as the core speed increases. Further, the desired clearance 78 for the standard day is relatively greater than the desired clearance 76 for the cold day. Similarly, the desired clearance 80 for the hot day is relatively greater than the desired clearance 76 and 78 for the cold and standard days. Thus, the desired range of clearance between the stationary and rotating components 54 and 52 changes with the core speed and certain other factors such as ambient temperature and altitude.

In this embodiment, the clearance between the stationary and rotating components 54 and 52 is measured during engine start-up, idle and during operation of the engine. The measurement accuracy required during engine start-up or idle condition is relatively lower than the required accuracy during the operation of the engine. Further, the required measurement range of the clearance measurement system is different for engine start-up, idle and during operation. For example, during operation the measurement range is about one-fourth the measurement range during idle and start-up modes. In the illustrated embodiment, the operational mode of each the sensors 58, 60 and 62 is adjusted based upon the measured rotor speed as will be described below.

Figure 5:
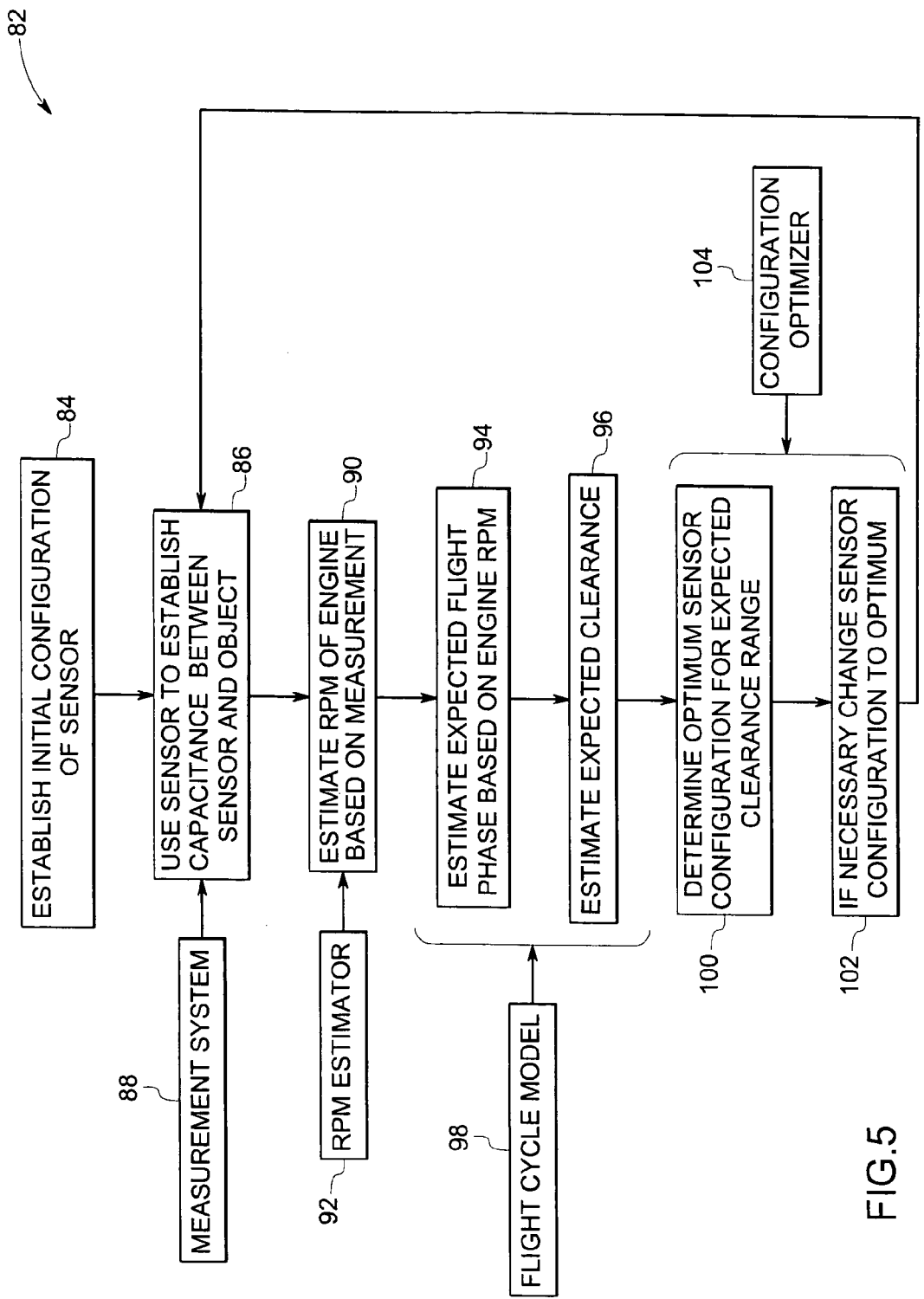
FIG. 5 is a diagrammatical illustration of an exemplary process of method of operation of the measurement system of FIG. 3 in accordance with embodiments of the present technique.

FIG. 5 is a diagrammatical illustration of an exemplary process 82 of the method of operation of the measurement system of FIG. 3. As illustrated, an initial configuration of sensor is established for measurement of the clearance between two objects (block 84). In this embodiment, the sensor is disposed on a first object, such as a stationary component in an engine. Further, as represented by block 86, the initial configuration of the sensor is employed to establish the capacitance between the sensor and the second object via a measurement system 88. In this embodiment, the second object includes a rotating object, such as a rotor of the engine. At block 90, a rotational speed of the rotor is measured via a RPM estimator 92. In this embodiment, the speed of rotation is measured based upon a frequency of blades of the rotating component passing by the sensor.

Moreover, based upon the measured rotational speed, an expected flight phase is estimated (block 94). As represented by block 96, an expected clearance between the first and second objects is estimated. In the illustrated embodiment, the expected flight phase and the expected clearance are estimated by a flight cycle model 98. Further, an optimum sensor configuration for the expected clearance range is determined (block 100) and if required the sensor configuration is changed to an optimum configuration, as represented by block 102. In one embodiment, the configuration of the sensor may be modified by coupling additional conductive elements to the initial configuration of the sensor. Alternatively, the configuration of the sensor may be changed by removing some conductive elements from the initial configuration of the sensor. In this embodiment, a configuration optimizer 104 is employed for determining the optimum configuration and changing the sensor configuration to the optimum configuration. As will be appreciated by those skilled in the art, the method steps from 86-102 may be iterated to achieve the desired resolution and range of measurement.

Figure 6:
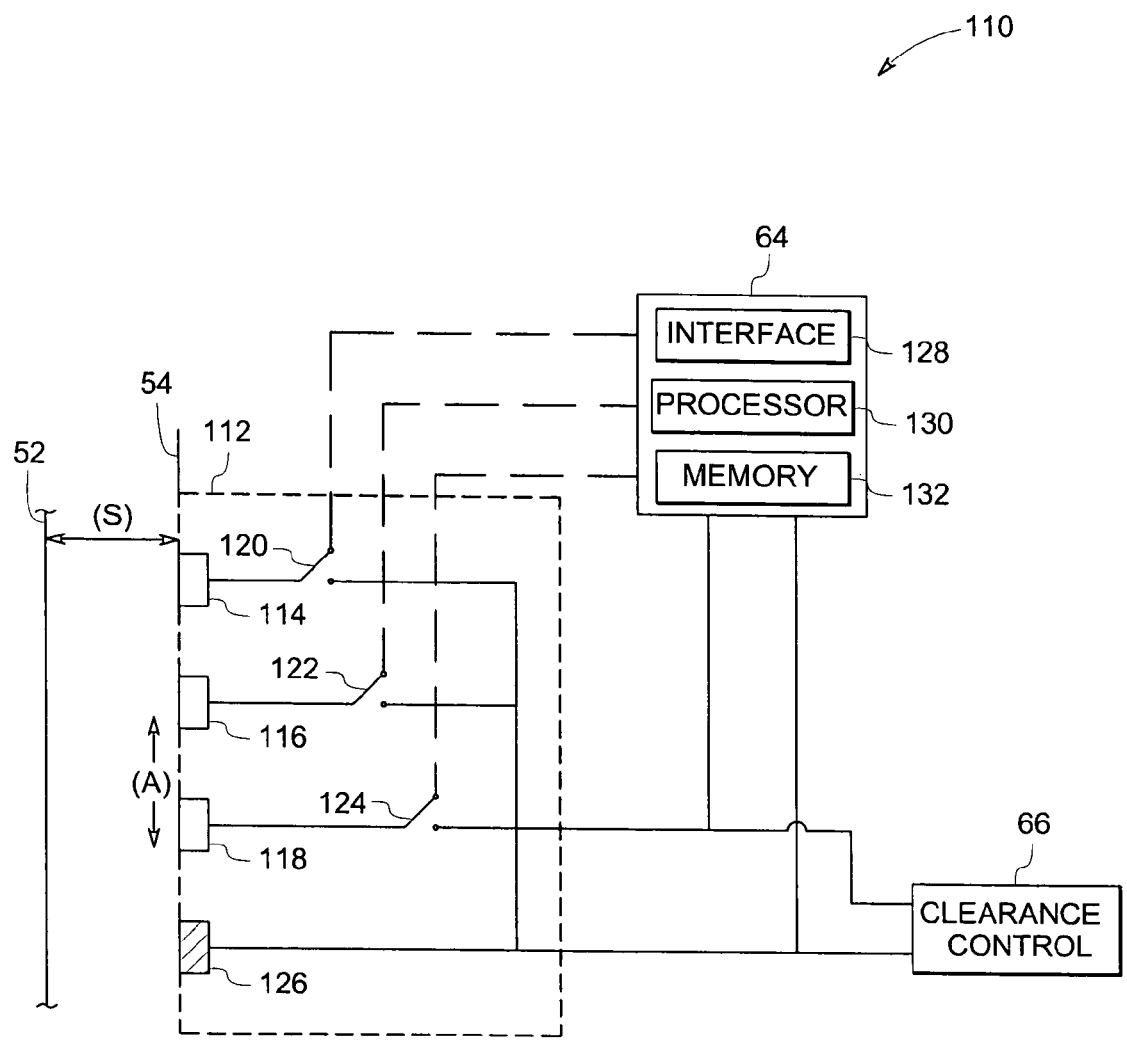
FIG. 6 is a diagrammatical illustration of the clearance measurement system of FIG. 3 in accordance with embodiments of the present technique.

FIG. 6 is a diagrammatical illustration of the clearance measurement system 110 of FIG. 3. The clearance measurement system 110 includes a probe 112 disposed on a stationary component such as shroud 54 and is configured to measure the rotational speed of a movable component such as rotor 52 of the turbine 50. In this embodiment, the probe 112 includes a capacitive probe. In the illustrated embodiment, the probe 112 includes a first conductive element 114, a second conductive element 116, and a third conductive element 118. However, a greater or lesser number of conductive elements may be employed in the clearance measurement system 110. The probe 112 is coupled to the controller 64 for controlling the measurement range of the probe 112 based upon the rotational speed of the rotor 52.

Further, the clearance measurement system 110 includes a first switch 120, a second switch 122, and a third switch 124 for selectively coupling the conducting elements 114, 116 and 118 to the controller 64. As described in greater detail below, the controller 64 is operable to optimize the configuration of the probe 112 based on the rotational speed of the rotor 52 by selectively coupling the conductive elements 114, 116, and 118 together. The conducting elements 114, 116 and 118 are also coupled to the clearance control system 66 that is operable to control the separation between the stationary and rotating components 54 and 52. An additional conductive element 126 is provided to act as a return path and to shield the probe 112 from noise and interference. However, a greater number of conductive elements may be coupled to the conductive element 126 for shielding the probe 112.

In the illustrated embodiment, the controller 64 is configured to optimize the area (A) of the probe 112 based upon the measured rotational speed. In operation, the measured rotational speed is compared with a pre-determined rotational speed. In this embodiment, the probe 112 will switch to a high accuracy mode when the measured rotational speed exceeds the pre-determined value whereby the clearance between the stationary and rotating components 54 and 52 is measured based upon a normal operating range of the probe 112. Alternatively, the probe 112 switches to a low accuracy mode when the measured rotational speed is less than the pre-determined value whereby the clearance between the stationary and rotating components 54 and 52 is estimated over an extended measurement range of the probe 112. Thus, the clearance between the stationary and rotating components 54 and 52 is calculated based upon the selected mode of the probe 112.

In operation, the controller 64 optimizes the area of the probe 112 based upon the measured rotational speed of the rotor 52. The controller 64 controls the area (A) of the probe 112 by selectively closing the switches 120, 122 and 124, thereby controlling the specific conductive elements 114, 116 and 118. For example, for a low clearance mode, the controller 64 may couple a single conductive element 118, other than the return path 126 to the output of the probe 112, by closing switch 124 and opening switches 120 and 122. Alternatively, for a high clearance mode, the controller 64 may operatively couple conductive elements 114 and 116 to the output by closing switches 120 and 122.

In the illustrated embodiment, the controller 64 comprises an interface 128 for facilitating control of the switches 120, 122, and 124. In addition, the controller 64 also comprises a processor 130 for processing the signal from the probe 112 and directing the interface to selectively open and close the switches 120, 122, and 124 based upon the measured rotational speed of the rotor 52. Moreover, the controller 64 also includes a memory circuitry 132 for storing pre-defined programs, internal references, and other information for controlling the selectively coupling of the conductive elements 114, 116 and 118.

As described above, switches 120, 122 and 124 are employed for coupling the conductive elements 114, 116 and 118 to the probe 112. In one embodiment, the switches 120, 122 and 124 comprise solid-state switches. In another embodiment, the switches 120, 122 and 124 may comprise mechanical relays. In yet another embodiment, the switches 120, 122 and 124 may comprise radio frequency micro-electromechanical systems switches. It should be noted that, coupling of additional conductive elements 116 and 118 via the switches 122 and 124 enhances a range of measurement of the probe 112. In another embodiment, the conductive elements that are not being utilized to be coupled together for enhancing the measurement range of the probe 112, may be coupled to the conductive element 126 to provide additional shielding. In another embodiment, the unused conductive elements may be held at a pre-determined potential to reduce interference in the measurement.

Figure 7:
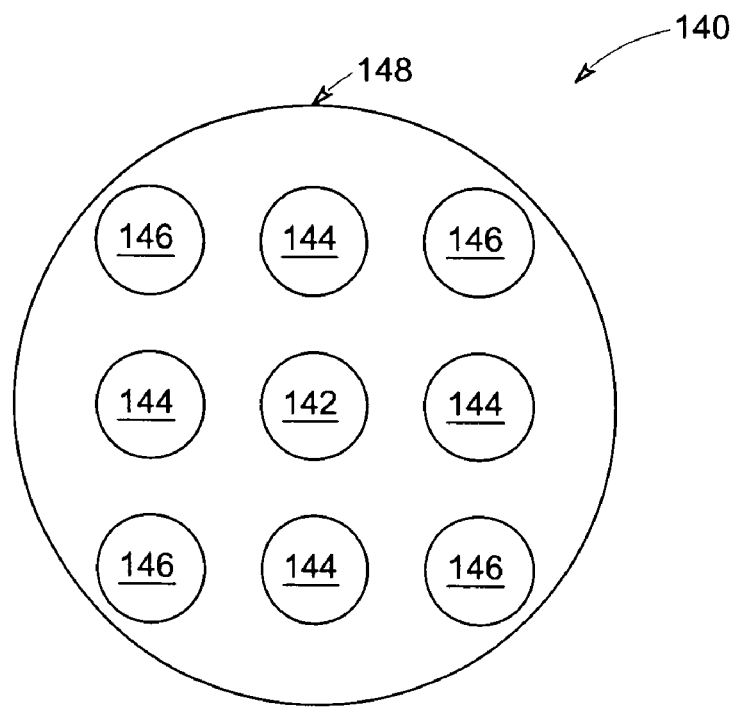
FIG. 7 is a diagrammatical illustration of a sensor with a patterned array of conductive elements in accordance with embodiments of the present technique.

FIG. 7 is a diagrammatical illustration of a sensor 140 with a patterned array of conductive elements. In the illustrated embodiment, the conductive elements comprise a center conductive element 142, a first group of conductive elements 144, and a second group of conductive elements 146 that are arranged in a pre-determined pattern. The center conductive element 142 may be coupled to the probe 140 for all ranges of measurement by the probe 140. The first group of conductive elements 144 may be coupled to the center conductor 142 to increase the area (A). If additional area is needed, the second group of conductive elements 146 may be coupled to the center conductor 142 and to the first group of conductive elements 144. However, other configurations may be used. An outer conductive element 148 is disposed around the conductive elements 142, 144, and 146 to act as a return path and to shield the conductive elements 142, 144, and 146 from electrical noise and interference. In an alternative embodiment, any unused conductive elements may be coupled to the outer conductive element 148.

Figure 8:
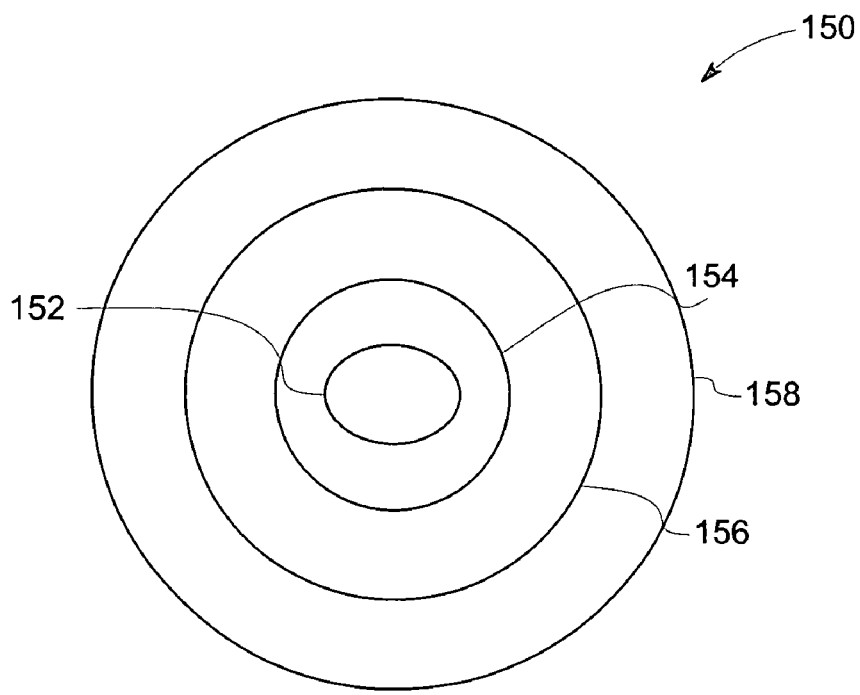
FIG. 8 is a diagrammatical illustration of a sensor with an annular array of conductive elements in accordance with embodiments of the present technique.

FIG. 8 is a diagrammatical illustration of a sensor 150 with an annular array of conductive elements. The probe 150 includes a center conductive element 152 and cylindrical conductive elements 154 and 156 surrounding the center conductive element 152 in an annular concentric pattern. An outer conductive element 158 is disposed concentrically around the conductive elements 152, 154 and 156 to reduce the effect of any electrical noise and interference on the measurement of capacitance. Again, the probe 150 may have a lesser or greater number of conductive elements based upon a desired range of measurement. Moreover, the conductive elements 154 and 156 may be selectively coupled to the center conductive element 152 for enhancing the resolution of the probe 150.

The measurement technique described hereinabove provides an accurate measurement of the clearance between a stationary object and an adjacent moving part over an entire range of operation. The various aspects of the method described hereinabove have utility in applications where clearance measurements over a wide range of distance are desired or improve the performance of the system. For example, the technique described above may be used for measuring the clearance between a rotating component and a stationary component in an aircraft engine. As noted above, the method described here may be advantageous for measurements over a wide range of distances by selecting a sensor configuration based upon the measured speed of rotation of the rotating component via selectively coupling the conductive elements of the sensor to tailor the area of the sensor to measure the distance between the objects.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for measuring clearance between a stationary object and a movable object, comprising:
   at least one sensor comprising a plurality of conductive elements, and disposed on the stationary object and configured to measure an operating parameter corresponding to the movable object; and
   a controller coupled to the at least one sensor, wherein the controller is configured to continuously tune a sensitivity of the sensor and adjust an operating range of the sensor based upon the measured operating parameter by selectively coupling the conductive elements to an output of the sensor.

2. The system of claim 1, wherein the movable object comprises a rotor of an aircraft engine and the stationary object comprises a casing disposed about the rotor.

3. The system of claim 1, wherein the operating parameter comprises a speed of rotation of the movable object.

4. The system of claim 1, wherein the sensor comprises a capacitive probe.

5. The system of claim 4, wherein the sensor comprises a plurality of switches operable to selectively couple each of the plurality of the conductive elements to the output of the sensor.

6. The system of claim 5, wherein the plurality of switches comprises solid-state switches, or mechanical relays, or radio frequency micro electromechanical systems switches.

7. The system of claim 1, wherein the controller comprises a look-up table, or a calibration curve, or an analytical model, or a calculation, or combinations thereof for selecting the operating mode of the sensor based upon the measured operating parameter.

8. The system of claim 1, wherein tuning comprises optimizing a configuration of the sensor.

9. The system of claim 8, wherein optimizing the configuration of the sensor comprises optimizing a measurement range of the sensor.

10. The system of claim 9, wherein optimizing the measurement range of the sensor comprises optimizing an area of the sensor.

11. A system for measuring clearance between a stationary object and a movable object, comprising:
    a sensor comprising:
      a plurality of conductive elements configured to measure an operating parameter corresponding to the movable object; and
      a plurality of switches configured to selectively couple the plurality of conductive elements based upon the measured operating parameter to control an operating range of the sensor.

12. The sensor of claim 11, further comprising a controller coupled to the sensor and configured to continuously tune a sensitivity of the sensor, and adjust the operating range of the sensor based upon the measured operating parameter by selectively coupling the plurality of conductive elements to an output of the sensor.

13. The sensor of claim 11, wherein the sensor comprises a capacitive probe and the operating parameter comprises a speed of rotation of the object.

14. The sensor of claim 11, wherein the plurality of conductive elements are arranged in a pre-determined pattern.

15. The sensor of claim 11, wherein the plurality of switches comprises solid-state switches, mechanical relays, or radio frequency micro electromechanical systems switches.

16. The sensor of claim 11, wherein at least one of the plurality of conductive elements is operable to shield the sensor from noise and interference.

17. A system for measuring clearance between a stationary object and a movable object, comprising:
    a sensor comprising:
      a plurality of conductive elements configured to measure an operating parameter corresponding to the movable object;
      a plurality of switches configured to selectively couple the plurality of conductive elements based upon the measured operating parameter to control an operating range of the sensor; and
    a controller coupled to the sensor configured to continuously tune a sensitivity of the sensor, and adjust the operating range of the sensor based upon the measured operating parameter by selectively coupling the plurality of conductive elements to an output of the sensor.

18. The sensor of claim 17, wherein the sensor comprises a capacitive probe and the operating parameter comprises a speed of rotation of the object.

19. The sensor of claim 17, wherein the plurality of conductive elements are arranged in a pre-determined pattern.

20. The sensor of claim 17, wherein the plurality of switches comprises solid-state switches, mechanical relays, or radio frequency micro electromechanical systems switches.

* * * * *

UNITED STATES PATENT AND TRADEMARK OFFICE
CERTIFICATE OF CORRECTION

PATENT NO. : 7,652,489 B2
APPLICATION NO. : 11/295362
DATED : January 26, 2010
INVENTOR(S) : Dasgupta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

Twenty-eighth Day of December, 2010

David J. Kappos
*Director of the United States Patent and Trademark Office*